US011694571B2

(12) United States Patent
Tanaka et al.

(10) Patent No.: US 11,694,571 B2
(45) Date of Patent: Jul. 4, 2023

(54) INFORMATION PROCESSING SYSTEM, INFORMATION PROCESSING APPARATUS, AND NON-TRANSITORY STORAGE MEDIUM

(71) Applicant: TOYOTA JIDOSHA KABUSHIKI KAISHA, Toyota (JP)

(72) Inventors: Yurika Tanaka, Yokosuka (JP); Shuichi Sawada, Nagoya (JP); Shin Sakurada, Toyota (JP); Yasuhiro Baba, Kawabe-chou (JP); Shintaro Matsutani, Kariya (JP); Tomoya Makino, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/362,175

(22) Filed: Jun. 29, 2021

(65) Prior Publication Data
US 2022/0020287 A1   Jan. 20, 2022

(30) Foreign Application Priority Data
Jul. 17, 2020   (JP) .................................. 2020-123169

(51) Int. Cl.
G09B 19/00   (2006.01)
G06V 40/10   (2022.01)

(52) U.S. Cl.
CPC ......... *G09B 19/003* (2013.01); *G06V 40/103* (2022.01)

(58) Field of Classification Search
CPC .. G09B 19/003; G09B 19/00; G09B 19/0038; G06V 40/23; G06V 40/10; G06V 10/454; G06V 10/82; G06V 40/103
See application file for complete search history.

(56) References Cited

U.S. PATENT DOCUMENTS

2010/0228488 A1\* 9/2010 Leuthardt ............. A61B 5/1116
340/407.1
2012/0271143 A1\* 10/2012 Aragones ................. G09B 5/02
600/595
2016/0193500 A1\* 7/2016 Webster ............. G06Q 30/0251
434/247

FOREIGN PATENT DOCUMENTS

| JP | 6271698 B1 | 1/2018 |
| WO | 2013/172173 A1 | 11/2013 |
| WO | 2018/207232 A1 | 11/2018 |

\* cited by examiner

*Primary Examiner* — Robert J Utama
(74) *Attorney, Agent, or Firm* — Oliff PLC

(57) ABSTRACT

An information processing system comprises a sensor configured to sense a first posture that a user is taking; a storage configured to store posture data about a posture of a person; and a controller configured to create advice for the user regarding a negative influence on a body of the user, based on sensor data acquired from the sensor and the posture data.

18 Claims, 11 Drawing Sheets

EVALUATION DATA 102B

| POSTURE CLASS | EVALUATION VALUE | AFFECTED PART | LEVEL OF STRESS | DETAILS OF INFLUENCE | SUGGESTIONS FOR IMPROVEMENT |
|---|---|---|---|---|---|
| C001 | 95 | NONE | NONE | NONE | - |
| C002 | 95 | NONE | NONE | NONE | - |
| C003 | 50 | LOWER BACK | BODY WEIGHT · 0.3 kg | RISK OF SPINAL DISC HERNIATION | SIT BACK IN THE CHAIR |
| C004 | 70 | NECK/SHOULDERS | BODY WEIGHT · 0.1 kg | RISK OF TEXT NECK | TUCK IN THE CHIN |
| C005 | 95 | NONE | NONE | NONE | - |
| ... | ... | ... | ... | ... | ... |

```
◆ Advice regarding Posture ◆

You are sitting with rounded shoulders.

This may result in stiff shoulders,
stiff neck and headache.

Please be advised to pull back your
shoulders and straighten your back.
```

FIG. 6B

◆ Advice regarding Posture ◆

You are taking forward
head posture over a sustained
period of time.

This may lead to text neck.

Please be advised to pull back your
head when looking at the screen.

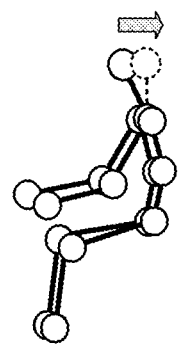

INFORMATION PROCESSING SYSTEM, INFORMATION PROCESSING APPARATUS, AND NON-TRANSITORY STORAGE MEDIUM

CROSS REFERENCE TO THE RELATED APPLICATION

This application claims the benefit of Japanese Patent Application No. 2020-123169, filed on Jul. 17, 2020, which is hereby incorporated by reference herein in its entirety.

BACKGROUND

Technical Field

The present disclosure relates to a technology for assisting a user.

Description of the Related Art

There is a technology for detecting that there is a problem with a posture of a user. For example, Japanese Patent No. 6271698 discloses an apparatus that is used in relation to an escalator, the apparatus being for detecting that there is a user who is operating a smartphone on the escalator, and for notifying the user that there is a problem with a boarding posture.

SUMMARY

There is a demand to fix various postures that negatively affect the body, such as rounded shoulders and a sway back. However, even if a bad posture can be detected, a user cannot be informed of which posture would alleviate the negative influence on the body.

An object of the present invention is to provide a technology for providing information for fixing a posture.

A first mode of the present disclosure is an information processing system including: a sensor configured to sense a first posture that a user is taking; a storage configured to store posture data about a posture of a person; and a controller configured to create advice for the user regarding a negative influence on a body of the user, based on sensor data acquired from the sensor and the posture data.

Furthermore, a second mode of the present disclosure is an information processing apparatus including: a storage configured to store posture data about a posture of a person; and a controller configured to create advice for a user regarding a negative influence on a body of the user, based on sensor data acquired from a sensor configured to sense a first posture that the user is taking and the posture data.

Furthermore, a third mode of the present disclosure is a program for causing a computer to perform: acquisition of posture data about a posture of a person; and creation of advice for a user regarding a negative influence on a body of the user, based on sensor data acquired from a sensor configured to sense a first posture that the user is taking and the posture data.

Furthermore, as another mode, there may be cited an information processing method that is performed by the information processing apparatus described above, or a non-transitory computer-readable storage medium storing the program described above.

According to the present invention, information for fixing a posture may be provided.

BRIEF DESCRIPTION OF THE DRAWINGS

FIG. 5 is a diagram for describing evaluation data that is stored in a storage unit;

FIGS. 6A and 6B are examples of advice that is output through an input/output unit;

DESCRIPTION OF THE EMBODIMENTS

Figure 1:
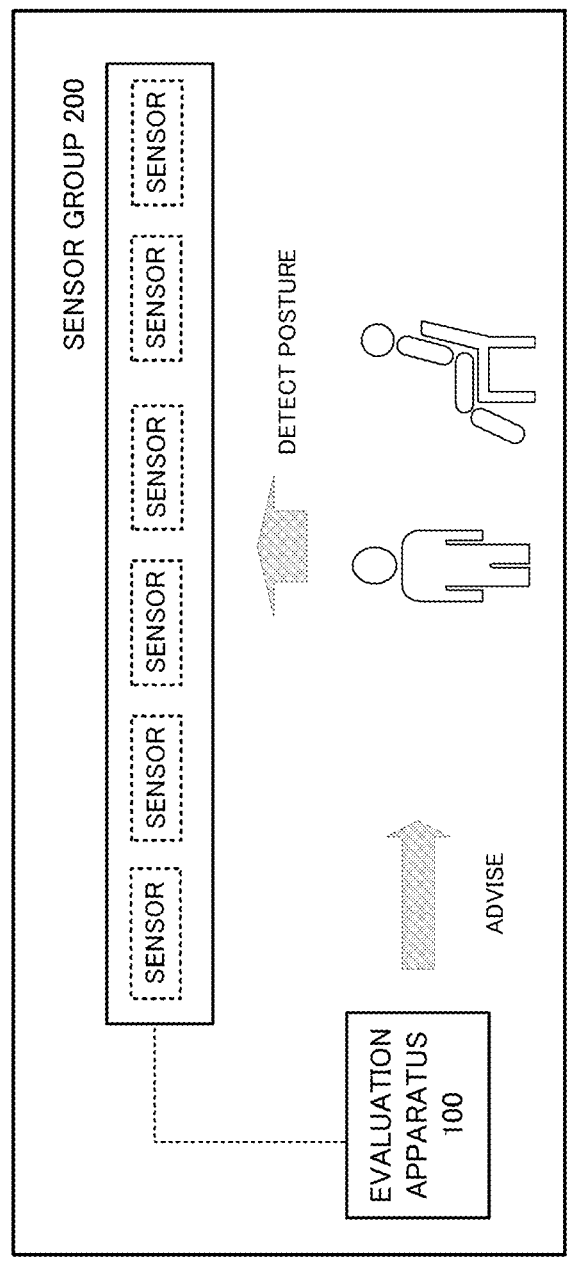
FIG. 1 is a diagram for describing an outline of an information processing system.

There is known an apparatus that detects an undesirable posture and that notifies a user of the same. However, such an apparatus may output assistive information, but cannot inform the user of how to fix the posture.

An information processing system according to a present disclosure is a system that detects that a user is taking an undesirable posture, and that provides the user with detailed information about the posture.

Specifically, there are included a sensor configured to sense a first posture that a user is taking, a storage unit configured to store posture data about a posture of a person, and a controller configured to create advice for the user regarding a negative influence on a body of the user, based on sensor data acquired from the sensor and the posture data.

The sensor may be an image sensor, a distance sensor or the like so long as the posture that a user is taking can be sensed.

The posture data is data about a posture of a person, and is typically data used to evaluate the posture of a user that is obtained by sensing. The controller creates advice regarding a negative influence on the body of the user based on the sensor data obtained by sensing and the posture data that is stored. For example, advice indicating that a seating posture is bad, and stress is placed on a lower back or a risk of spinal disc herniation or the like is increased is created. According to such a configuration, a user can be informed as to how the current posture affects the body, what kind of risk is created, or how such a risk can be reduced.

Additionally, the controller may create the advice after estimating the negative influence on the body of the user caused by the first posture.

Furthermore, the controller may classify the first posture based on a feature obtained from the sensor data.

A posture may be identified by classifying a feature obtained by sensing. For example, a classification result may be obtained by using a machine learning model that is capable of identifying a plurality of postures (including a desirable posture and an undesirable posture).

Furthermore, the posture data may be data associating the first posture and details of the negative influence on the body.

Details of the negative influence are typically information about a disease risk. According to such a configuration, a user taking a specific posture may be notified of details of a specific risk.

Furthermore, the posture data may be data further associating the first posture and a level of stress that is placed on at least one of a plurality of body parts, and the controller may create the advice indicating the level of the stress.

When the level of stress that is placed on a specific body part is acquired, specific advice may be given to the user.

Moreover, the controller may acquire a way to fix the posture to negate the negative influence on the body, based on the posture data.

Furthermore, the controller may create the advice including a manner of moving a body part such that the first posture is shifted to a second posture that negates the negative influence.

The user may thus be taught as to a way to fix the posture, such as "take a backward-leaning posture" or "sit back in the chair", or as to a specific manner of moving a body part such as "tuck in the chin", and the user may be encouraged to improve the posture.

Moreover, the controller may further determine an action that the user is performing.

Furthermore, the posture data may be data defined for each action that is performed by the user, and the controller may select a corresponding piece of the posture data based on the action that the user is performing.

Whether the posture a user is taking is appropriate or not is desirably determined based on the action of the user. For example, even in a case where a stooping posture is detected, if the user is washing his/her face, such a posture is temporal and should not be seen as a problem. However, if the action that the user is performing is "desk work" and the same posture is taken for a long period of time in a seated state, improvement should be encouraged.

Accordingly, by determining the action that the user is performing, more appropriate advice may be given.

Moreover, the controller may determine the action that the user is performing, based on the sensor data that is acquired in time series.

By expanding the data that is used to determine the posture in a time axis direction, the action of the user may be more accurately determined.

Moreover, the sensor may include a plurality of sensors that are installed in a building, and the controller may narrow down the action that the user is performing, based on an installation location of the sensor capturing the user.

The action of a user can be narrowed down based on the installation location of the sensor. For example, in a case where the sensor is installed in a kitchen-diner, the action may be narrowed down to "eating", "cooking" or the like. Moreover, in a case where the sensor is installed in a living room, the action may be narrowed down to "sitting on a sofa" or the like. The accuracy of determination of the action may thus be increased.

Hereinafter, embodiments of the present disclosure will be described with reference to the drawings. Configurations of the following embodiments are merely examples, and the present disclosure is not limited to the configurations of the embodiments.

First Embodiment

An outline of an information processing system according to a first embodiment will be described with reference to FIG. 1. The information processing system according to the present embodiment includes an evaluation apparatus 100 that evaluates the posture of a user, and a sensor group 200 including a plurality of sensors that sense the user indoors.

The evaluation apparatus 100 is an apparatus that evaluates the posture that a user is taking. The evaluation apparatus 100 determines the posture that a user is taking, by using a plurality of sensors that are installed in a predetermined facility (such as the home of the user). Furthermore, the evaluation apparatus 100 evaluates the posture that is determined, and in a case where an undesirable posture is detected, creates advice for the user and the outputs the same.

Additionally, in the example in FIG. 1, the evaluation apparatus 100 is installed indoors, but an installation location of the evaluation apparatus 100 may be a remote location. Moreover, one evaluation apparatus 100 may manage a plurality of users (who are possibly in different facilities).

Figure 2:
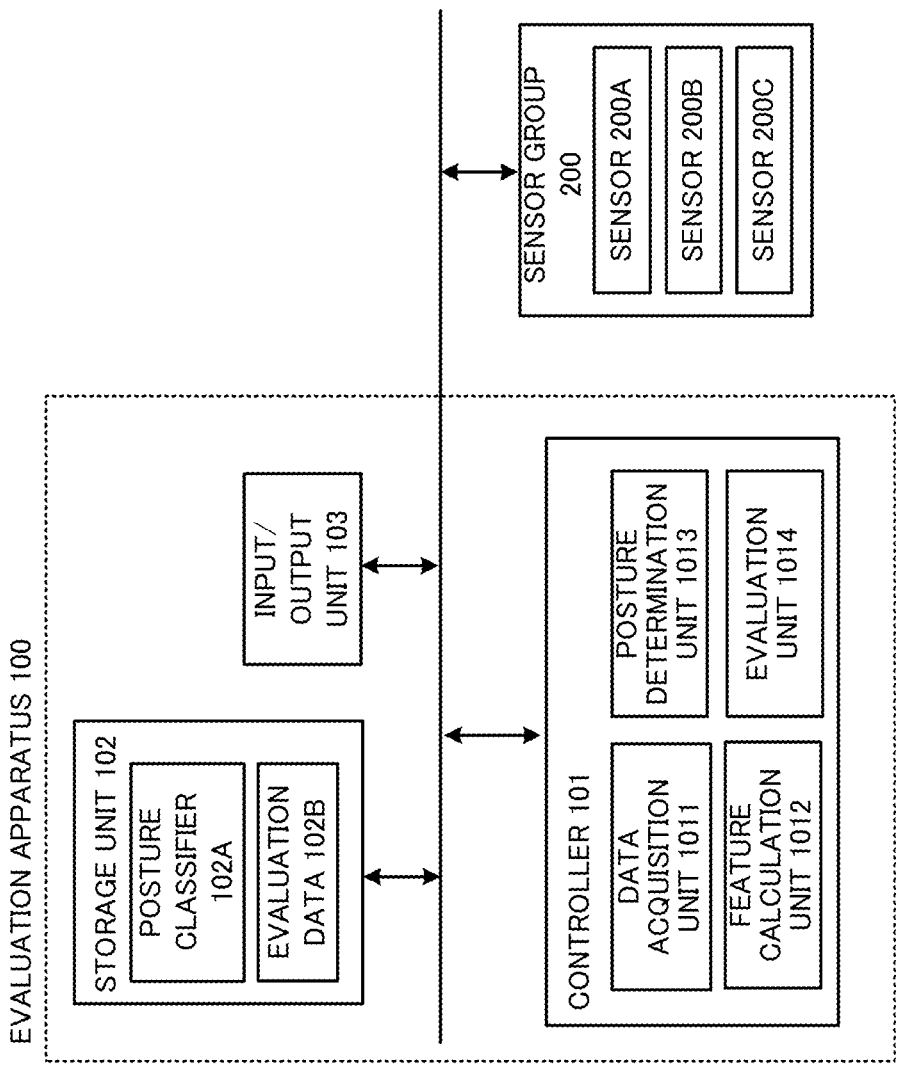
FIG. 2 is a diagram illustrating structural elements of an information processing system according to a first embodiment in detail.

FIG. 2 is a diagram illustrating structural elements of the information processing system according to the present embodiment in greater detail. First, sensors included in the sensor group 200 will be described.

The sensor group 200 includes a plurality of sensors that are installed indoors. Types of the sensors are not limited so long as data for detecting the posture of a user can be acquired. For example, a camera (an image sensor) that acquires visible light images or infrared images, a range image sensor, or a combination thereof may be used.

The plurality of sensors are capable of outputting sensor data. In the case where the sensor is an image sensor, the sensor data may be image data.

The sensors included in the sensor group 200 are desirably installed at a plurality of places, respectively, such that sensing may be performed in a behavior range of the user. For example, in the case where the home of the user is the target, the sensors may be installed in a plurality of rooms.

Additionally, an indoor space is described as an example in the present embodiment, but the installation locations of the sensors are not limited to an indoor space. For example, a user performing tasks outdoors may be taken as a target of sensing.

Furthermore, in the present embodiment, the home of a user is taken as an example of the predetermined facility, but a building that is associated with the evaluation apparatus 100 may be any facility without being limited to a home.

The evaluation apparatus 100 evaluates desirability of the posture a user is taking, based on sensor data obtained by sensing the user and data about posture that is stored in advance.

The evaluation apparatus 100 may be a general-purpose computer. That is, the evaluation apparatus 100 may be a computer that includes processors such as a CPU and a GPU, main memories such as a RAM and a ROM, and auxiliary memories such as an EPROM, a hard disk drive and a removable medium. Additionally, the removable medium may be an USB memory or a disk recording medium such as a CD or a DVD, for example. The auxiliary memory stores an operating system (OS), various programs, various tables and the like, and a function matching a predetermined object as described below may be implemented by a program stored in the auxiliary memory being loaded into a work area of the main memory and being executed, and each component or the like being controlled through execution of the program. However, one or some or all of the functions may alternatively be implemented by a hardware circuit such as an ASIC or an FPGA.

The controller 101 is an arithmetic unit that is in charge of control that is performed by the evaluation apparatus 100. The controller 101 may be implemented by an arithmetic processing unit such as a CPU.

The controller 101 includes four functional modules, namely, a data acquisition unit 1011, a feature calculation unit 1012, a posture determination unit 1013, and an evaluation unit 1014. Each functional module may be implemented by the CPU executing a stored program.

The data acquisition unit 1011 acquires sensor data from the sensors included in the sensor group 200. The sensor data that is acquired may be image data (such as a visible light image or an infrared image), range image data, or a combination of two or more of those listed above. The data acquisition unit 1011 may further acquire an ID of a sensor detecting a user. The sensor data acquired by the data acquisition unit 1011 is transmitted to the feature calculation unit 1012. Additionally, in the case where the sensor data does not indicate presence of a user, the data acquisition unit 1011 may discard the acquired sensor data.

The feature calculation unit 1012 converts the sensor data (such as the image data or the range image data) acquired by the data acquisition unit 1011 into a feature that represents the posture of a person.

Figure 3:
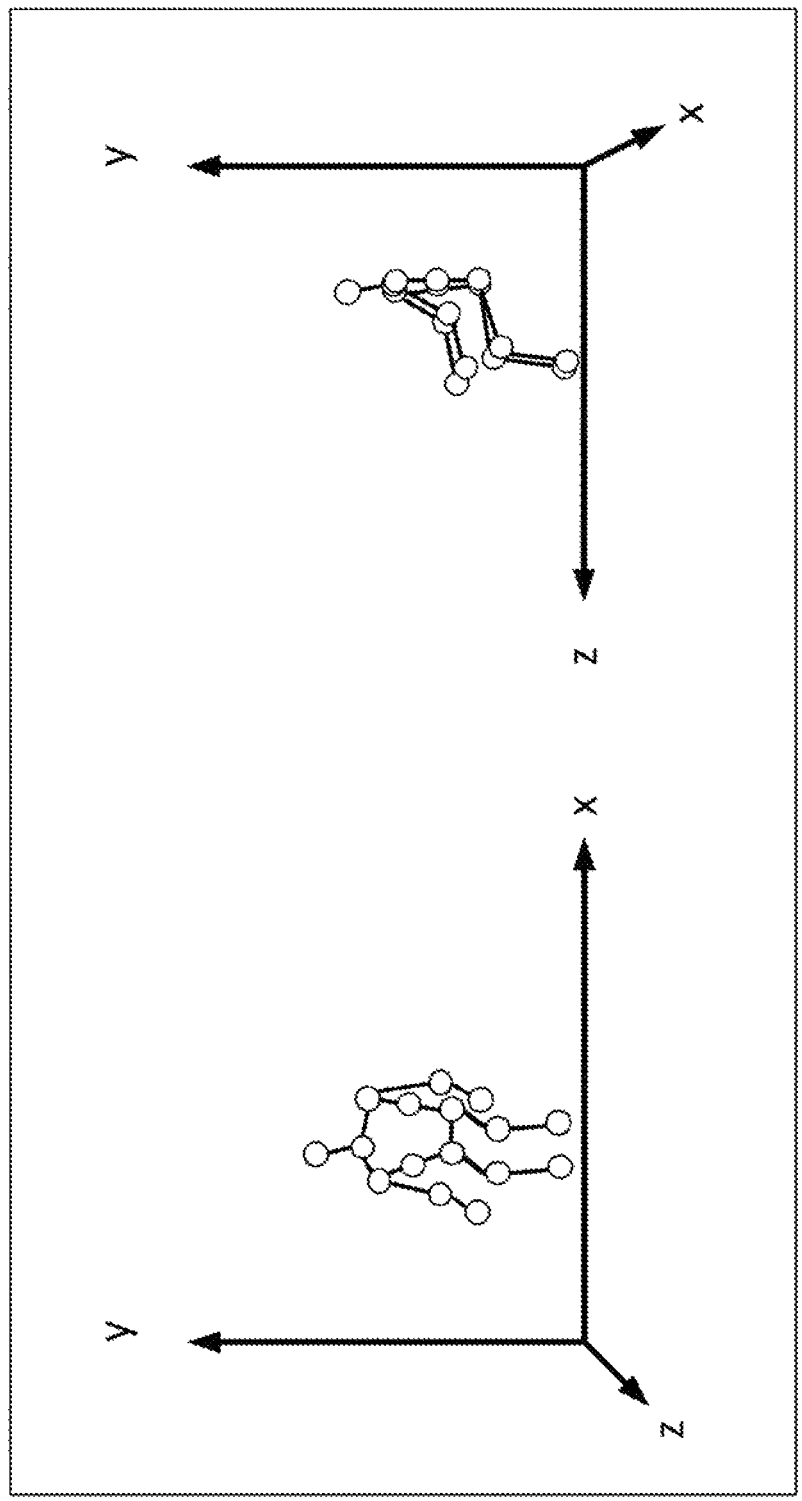
FIG. 3 is a diagram for describing a posture of a user that is sensed.

As a representative method for calculating the feature that represents the posture of a person, there is a method of using coordinates of body parts. For example, body parts such as the head, the neck, the left and right shoulders, the left and right elbows, the left and right palms, and the left and right hip joints are detected by analyzing the sensor data, and corresponding coordinates (such as two-dimensional coordinates or three-dimensional coordinates corresponding to a center of a target body part) are acquired. FIG. 3 is a diagram illustrating the three-dimensional coordinates of a plurality of body parts of a user sitting in a chair. The three-dimensional coordinates may be acquired by adding depth information that is obtained based on a range image to the two-dimensional coordinates of each body part detected from a visible light image, for example.

For example, detection of a body part may be performed using an identifier for detecting a predetermined body part. For example, an identifier for detecting two-dimensional coordinates or three-dimensional coordinates of M body parts is constructed using, as training data, data that is obtained by adding depth information $z_m$ (m=1, 2, . . . , M) to two-dimensional coordinates $(x_m, y_m)$ (m=1, 2, . . . , M) of the M body parts. By inputting the sensor data to the identifier, the two-dimensional coordinates $(x_m, y_m)$ or the three-dimensional coordinates $(x_m, y_m, z_m)$ (m=1, 2, . . . , M) of the M body parts may be acquired.

Additionally, in the present example, detection of the coordinates of predetermined body parts is cited as an example, but other detection targets may also be used so long as they are related to the posture of a person. For example, skeletal elements of a person may be detected.

The feature calculation unit 1012 converts a plurality of coordinates obtained in the above manner into a feature. The feature may be a collection (a vector) of a plurality of coordinates, for example.

Furthermore, the feature may be a value that is based on rankings of magnitudes of distances between a plurality of human body parts. For example, combinations are created for all of the plurality of human body parts and a distance between body parts is calculated for each pair, and rankings of the distances that are obtained may be taken as the feature. Expression (1) is an example of a feature F where the number of body parts that are detection targets is ten.

$$F=(R(D(1,2)),R(D(1,3)),R(D(1,4)), \ldots ,R(D(8,9)),R(D(9,10))) \quad \text{Expression (1)}$$

Here, D(m, n) represents a Euclidean distance between an m-th body part and an n-th body part in an image space, and R(D(m, n)) represents the ranking of D(m, n) when D(1, 2), D(1, 3), . . . , D(8, 9), D(9, 10) are arranged in a descending order.

The feature that is based on the rankings of the magnitudes of the distances between body parts is advantageous in that the feature is robust to scale conversion or a subtle change in position.

The posture determination unit 1013 classifies the posture of a user into a predetermined class based on the feature calculated by the feature calculation unit 1012. In the present embodiment, a plurality of postures (classes) that are detection targets are defined in advance and an identifier (a posture classifier 102A) that performs classification into respective classes is constructed in advance, and classification of a posture is performed by using the identifier. The posture classifier 102A is stored in the storage unit 102 described later.

Figure 4:
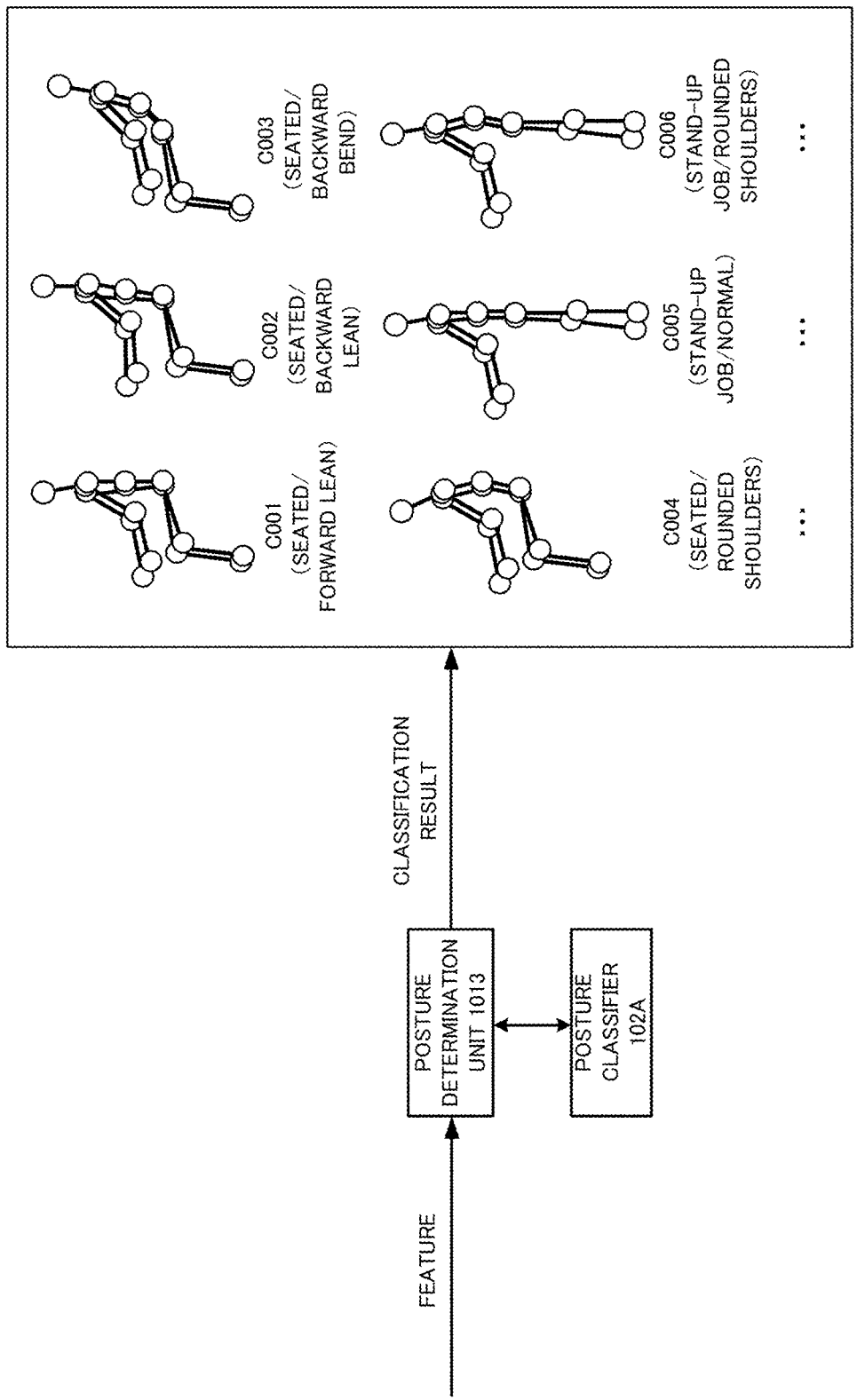
FIG. 4 is a diagram for describing a posture classification process that is performed by a posture determination unit.

FIG. 4 is a diagram for describing a classification process that is performed by the posture determination unit 1013. The posture determination unit 1013 inputs an acquired feature to the posture classifier 102A, and acquires a classification result as an output. For example, in the case of the present example, a classification result "seated in a forward-leaning posture (posture class: C001)" is acquired. As illustrated in the drawing, a plurality of postures as detection targets may include both desirable postures and undesirable postures.

The evaluation unit 1014 evaluates whether the posture that a user is taking is good or bad based on the classification result from the posture determination unit 1013 and evaluation data 102B described later. Furthermore, advice for the user is created and output based on the evaluation result.

A specific method will be described together with an example of the evaluation data 102B.

The storage unit 102 includes a main memory and an auxiliary memory. The main memory is a memory where programs to be executed by the controller 101, and data to be used by the control programs are developed. The auxiliary memory is a unit that stores the programs to be executed by the controller 101, and the data to be used by the control programs.

The storage unit 102 stores the posture classifier 102A described above. The posture classifier 102A is a machine learning model that is constructed in advance, and the posture classifier 102A classifies an input feature into one of a plurality of posture classes that are defined in advance.

Furthermore, the storage unit 102 stores data (the evaluation data 102B) that is used to evaluate a posture based on a classification result. The evaluation data 102B is data associating how the body of a user is affected when the user is taking a certain posture. FIG. 5 is an example of the evaluation data 102B.

In the example of FIG. 5, an evaluation value, an affected part, the amount of stress, details of influence, and suggestions for improvement are associated with each ID (the posture class) that is associated with a corresponding posture.

The evaluation value is a value (for example, an integer between 0 and 100) indicating desirability of a posture.

The affected part indicates a body part that is negatively affected. By referring to the affected part, it can be grasped that stress is placed on the lower back or on the neck, for example.

The amount of stress indicates the amount of stress that is placed on a specific body part. In the present example, for example, it can be grasped that, if a posture in class C003 is taken for a long time, stress amounting to "body weight×0.3 kg" is placed on the lower back.

Details of influence indicate specific details of negative influence. For example, information pieces such as "(if stress is placed on the lower back) there is a risk of spinal disc herniation" and "(if the neck is leaning forward) there is a risk of text neck" are stored.

Suggestions for improvement are information about measures to be taken to reduce the negative influence on the body. For example, information pieces such as "sit back in chair to reduce stress on the lower back" and "tuck in the neck to prevent text neck" are stored.

The evaluation unit 1014 acquires, based on the evaluation data 102B, information about the negative influence of the posture that a user is currently taking on the body, creates advice about measures to be taken to reduce the negative influence, and outputs the advice through the input/output unit 103 described later.

For example, the evaluation unit 1014 creates and presents a user interface screen including the affected part, details of the influence, suggestions for improvement and the like. FIG. 6A is an example of the user interface screen that is output. Additionally, the advice may also include information about the evaluation value and the amount of stress.

The input/output unit 103 is an interface through which information is input and output. For example, the input/output unit 103 includes a display unit and a touch panel. The input/output unit 103 may further include a keyboard, near-field communication unit, a touch screen. The input/output unit 103 may further include a unit for inputting/outputting audio.

The input/output unit 103 may include a function for communicating with a predetermined apparatus. For example, the input/output unit 103 may perform wireless communication with a terminal that is carried by the user (a user terminal). For example, swift information transmission may be enabled by transmitting created advice to the terminal that is carried by the user.

Moreover, the input/output unit 103 may also communicate with a server apparatus that is capable of communicating with a plurality of user terminals. In this case, the input/output unit 103 may transmit the advice to the server apparatus, together with information for identifying the user. For example, when the server apparatus transmits the advice to a target user terminal through push notification, the user may be efficiently notified of the advice.

Figure 7:
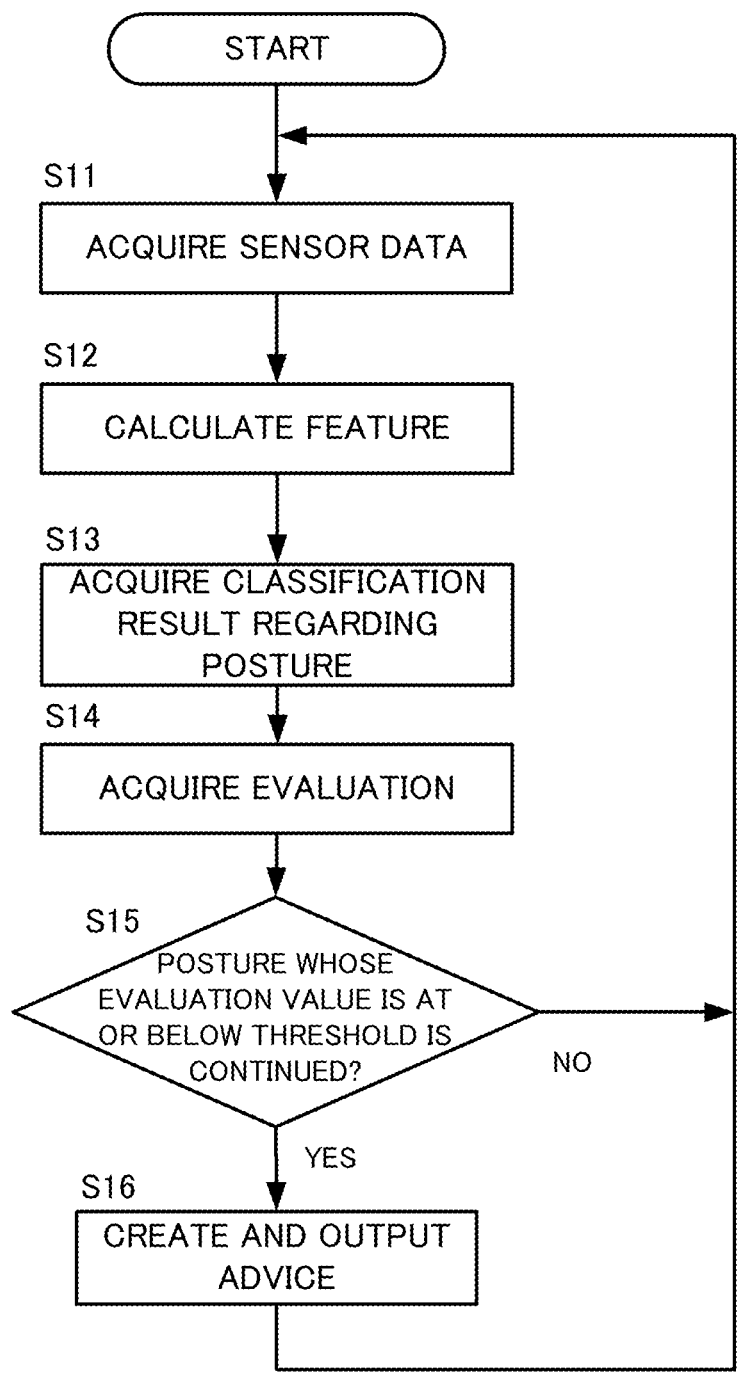
FIG. 7 is a flowchart of a process that is performed by a controller in the first embodiment.

Next, the process that is performed by the controller 101 will be described in greater detail. FIG. 7 is a flowchart of the process that is performed by the controller 101.

First, in step S11, the data acquisition unit 1011 acquires sensor data that is transmitted from a sensor included in the sensor group 200. The data acquisition unit 1011 temporarily accumulates the sensor data until an amount of data that is collected is enough to perform determination of the posture.

Next, in step S12, the feature calculation unit 1012 converts the sensor data into a feature.

In step S13, the posture determination unit 1013 inputs the obtained feature into the posture classifier 102A, and acquires a classification result.

In step S14, the evaluation unit 1014 acquires an evaluation of the posture based on the acquired classification result.

In step S15, the evaluation unit 1014 determines whether a state where the acquired evaluation (the evaluation value) is below a predetermined threshold (such as 85) is continued for a predetermined period of time (such as 3 minutes) or longer. In the case where the state where the acquired evaluation value is below the predetermined threshold is continued for the predetermined period of time or longer, the evaluation unit 1014 creates advice including the affected part and details of the influence, and outputs the advice through the input/output unit 103. Additionally, in the case where the evaluation data includes suggestions for improvement, the evaluation unit 1014 may also create advice about suggestions for improvement.

In the case where the acquired evaluation value is not below the predetermined threshold, or in the case where the state where the evaluation value is below the predetermined threshold is not continued for the predetermined period of time or longer, the process returns to step S11.

Additionally, if the user changes the posture according to the advice, and the evaluation value exceeds the threshold, output of the advice is stopped. The user may thus grasp in real time that the current posture is desirable.

As described above, the evaluation apparatus 100 according to the first embodiment may detect the posture of a user by a plurality of sensors that are installed indoors, estimate the negative influence of the posture on the body of the user, and notify the user of the same. According to such a configuration, a notification indicating that a user is taking an undesirable posture indoors may be issued to the user in real time, thereby contributing to the health of the user.

Second Embodiment

The evaluation apparatus 100 according to the first embodiment creates advice for a user and outputs the same, in a case where a certain posture continues for a predetermined period of time or longer. However, depending on the action of the user, appropriate advice is possibly not given. For example, in the case where the user is washing his/her face, a stooping posture is temporarily detected, but it is not appropriate to advise the user washing his/her face to avoid a stooping posture.

A second embodiment is an embodiment where, to cope with such circumstances, an action that a user is performing is identified, and evaluation of the posture is performed using a criterion different for each action that is identified.

Figure 8:
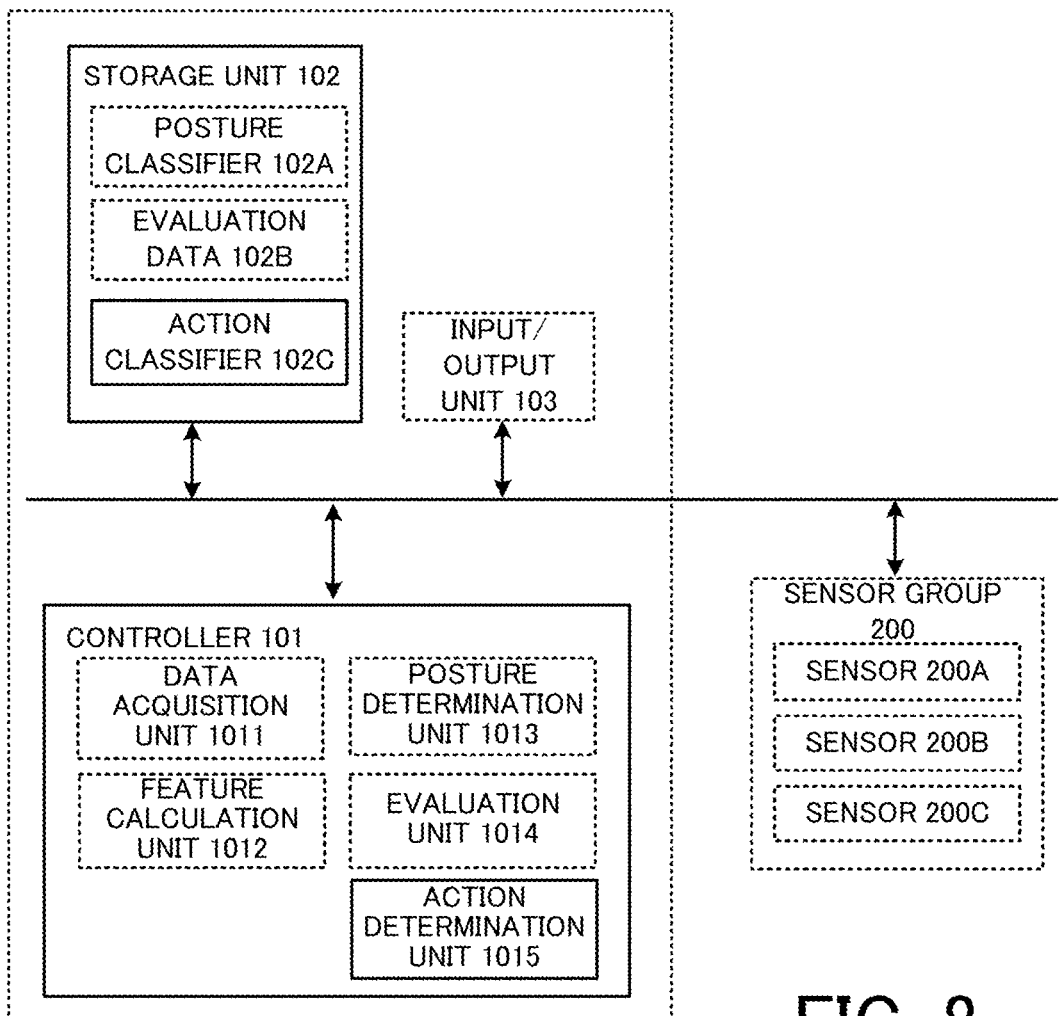
FIG. 8 is a diagram illustrating structural elements of an information processing system according to a second embodiment in detail.

FIG. 8 is a schematic configuration diagram of an information processing system according to the second embodiment. The evaluation apparatus 100 (the controller 101) according to the second embodiment is different from that in the first embodiment in that an action determination unit 1015 is further included. Furthermore, the evaluation apparatus 100 (the storage unit 102) according to the second embodiment is different from that in the first embodiment in that an action classifier 102C is further stored.

The action determination unit 1015 determines the action that a user is performing, based on the sensor data that is acquired by the data acquisition unit 1011 and by using the action classifier 102C.

The action classifier 102C is a machine learning model that is constructed in advance, and the action classifier 102C classifies an input feature into one of a plurality of action classes that are defined in advance. The action classifier 102C is stored in the storage unit 102.

Figure 9:
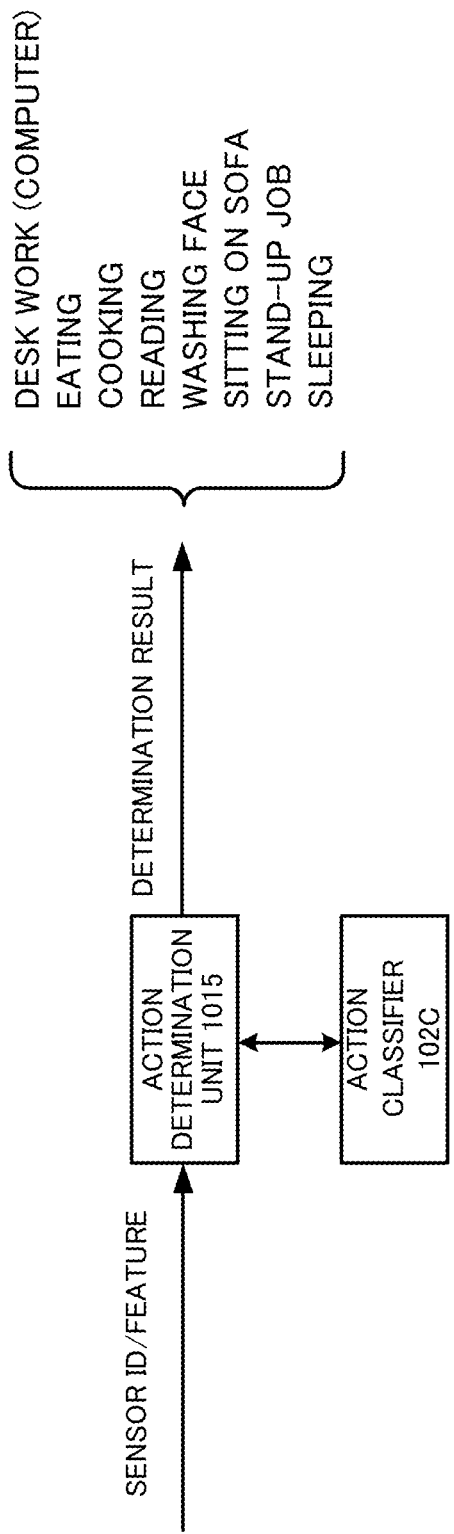
FIG. 9 is a diagram for describing an action classification process that is performed by an action determination unit.

FIG. 9 is a diagram for describing a classification process that is performed by the action determination unit 1015.

An action that a user is performing may be determined based on the sensor data or a feature that is obtained from the sensor data. Additionally, it is sometimes difficult to determine the action of a user using only the sensor data at one time point. In this case, the action may be determined based on a series of movements. For example, the action may be determined by acquiring the sensor data every predetermined period of time and converting the accumulated sensor data into features in time series, and by using the features in a time-series format.

Moreover, at the time of determining the action that a user is performing, an ID of the sensor that is sensing the user may be used in combination. For example, in the case where a sensor that is installed in a lavatory captures a user, the user is highly likely washing his/her face, brushing teeth, or undressing. In the case where a sensor that is installed in a kitchen-diner captures a user, the user is highly likely eating or cooking. At the same time, there is no possibility of cooking in a lavatory. Accordingly, an ID of a sensor (a sensor ID) capturing a user may be taken as input data to the action determination unit 1015, and the action determination unit 1015 may narrow down the action of the user by using the ID of the sensor. The action of a user may thus be accurately determined.

Figure 10:
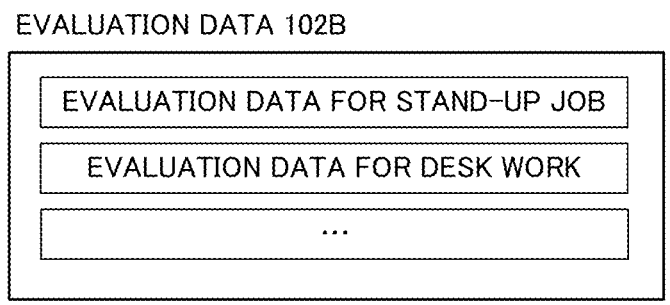
FIG. 10 is a diagram for describing evaluation data in the second embodiment.

In the second embodiment, the evaluation unit 1014 performs evaluation using different evaluation data 102B for each action that is determined. FIG. 10 is an example of evaluation data 102B that is defined for each action. Here, evaluation data for an action "desk work", and evaluation data for an action "stand-up job" are indicated as examples.

Figure 11:
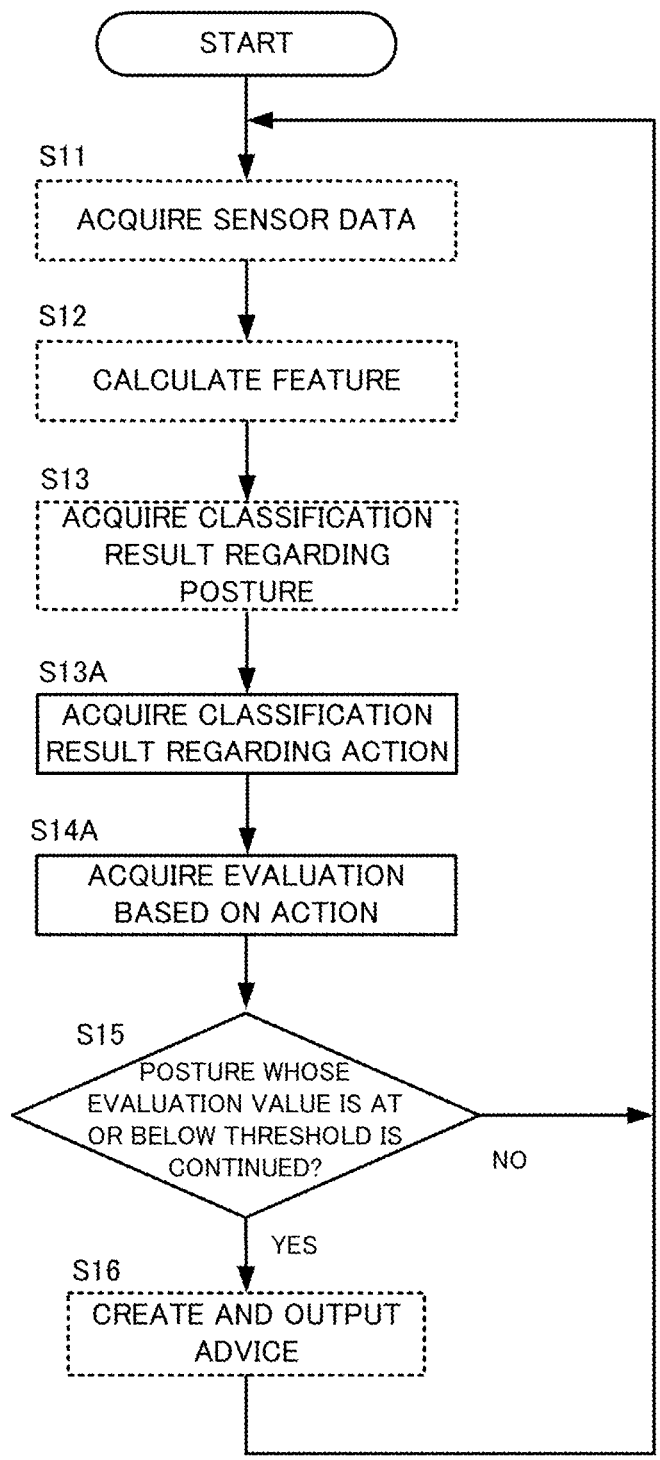
FIG. 11 is a flowchart of a process that is performed by the controller in the second embodiment.

Next, a process that is performed by the controller 101 in the second embodiment will be described in greater detail. FIG. 11 is a flowchart of the process that is performed by the controller 101 in the second embodiment.

The processes in steps S11 to S13 are the same as those in the first embodiment, and a detailed description thereof is omitted.

In step S13A, the action determination unit 1015 acquires the classification result of an action based on the feature that is acquired in step S12 and by using the action classifier 102C. The feature used at this time may be data in a time-series format.

Next, in step S14A, the evaluation unit 1014 evaluates the posture of the user based on the action of the user. Specifically, an action matching the action that is determined is extracted from the evaluation data 102B, and evaluation is performed by the same method as in the first embodiment.

Processes from step S15 are the same as those in the first embodiment.

As described above, in the second embodiment, the action that a user is performing is further acquired, and the posture is evaluated using the criterion according to the action. According to such a configuration, appropriate advice may be created and given in an indoor space where a user possibly performs various actions.

Third Embodiment

The evaluation apparatuses 100 according to the first and second embodiments are capable of advising a user that there is a problem with the current posture.

A third embodiment is an embodiment where a graphic illustrating the posture of a user is additionally created to be output at the same time as the advice.

In the third embodiment, the evaluation unit 1014 creates a graphic illustrating the current posture of a user, based on the coordinates of body parts obtained in the process of calculating the feature, and outputs the graphic in step S16. FIG. 6B is an example of a screen that is output in step S16. As illustrated in the drawing, when a graphic illustrating the coordinates of body parts is created, a user may intuitively grasp how the current posture is problematic.

Additionally, ideal positions of the body parts may be overlaid in the graphic (as indicated by a dotted line, for example). The user may thus grasp how to fix the posture. Information about the ideal positions of the body parts may be included in the evaluation data 102B, for example.

Example Modifications

The embodiments described above are merely examples, and the present disclosure may be changed and practiced as appropriate within the scope of the disclosure.

For example, the processes and units described in the present disclosure may be freely combined and practiced to the extent that no technical conflict occurs.

In the description of the embodiments, a feature that is obtained based on the sensor data is classified into a predetermined posture defined in advance, but the classification process does not necessarily have to be performed so long as it can be detected that a user is taking a characteristic posture. For example, in the case where a part of the feature (for example, a part corresponding to a spine among skeletal elements of a person) satisfies a certain condition (for example, a curvature corresponding to rounded shoulders), it can be determined that the corresponding posture is taken.

Furthermore, in the description of the embodiments, the predetermined period of time in step S15 (the time until output of the advice) takes a fixed value, but the period of time may be different for each posture. For example, advice may be output in a short period of time when a posture that places significant stress on a body part is taken. Thus, for example, a user may be notified in a short period of time that there is a risk of an acute disease (such as a sprained back) due to lifting a heavy object with an inappropriate posture. In contrast, in the case where the stress that is placed on body parts is small, the period of time until the advice is output may be increased. Thus, for example, in the case where a seated posture is taken for a long period of time due to desk work, the user may be notified of a risk of a chronic disease (such as a chronic lower back pain).

The threshold for such a period of time may be defined in the evaluation data 102B. Moreover, the threshold for the period of time may be defined for each action.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs implementing the functions described in the above embodiments to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions such as read-only memories (ROMs), random access memories (RAMs), EPROMs, EEPROMs, magnetic cards, flash memories, and optical cards.

What is claimed is:

1. An information processing system comprising:
   a sensor configured to sense a first posture that a user is taking;
   a storage configured to store posture data about a plurality of postures of a person; and
   a controller configured to determine what type of an action is being performed by the user based on sensor data acquired from the sensor, select a set of posture data associated with the action that the user is performing from the posture data, and create advice for the user regarding a negative influence on a body of the user,
   wherein the posture data is data that associates the plurality of postures with values indicating desirability of each posture, and is defined for each of a plurality of predefined actions; and
   the controller acquires a value of the desirability corresponding to the first posture and creates the advice, if the value indicating the desirability corresponding to the first posture is below a predetermined threshold.

2. The information processing system according to claim 1, wherein
   the controller classifies the first posture based on a feature obtained from the sensor data.

3. The information processing system according to claim 1, wherein
   the posture data comprises data associating the first posture and details of the negative influence on the body.

4. The information processing system according to claim 3, wherein
   the posture data further comprises data associating the first posture and a level of stress that is placed on at least one of a plurality of body parts, and
   the controller creates the advice indicating the level of the stress.

5. The information processing system according to claim 1, wherein
   the controller acquires a way to fix the posture to negate the negative influence on the body, based on the posture data.

6. The information processing system according to claim 5, wherein
   the controller creates the advice including a manner of moving a body part such that the first posture is shifted to a second posture that negates the negative influence.

7. The information processing system according to claim 1, wherein
   the controller determines the action that the user is performing, based on the sensor data that is acquired in time series.

8. The information processing system according to claim 1, wherein
   the sensor includes a plurality of sensors that are installed in a building, and
   the controller narrows down the action that the user is performing, based on an installation location of the sensor capturing the user.

9. The information processing system according to claim 1, wherein
   the controller estimates the negative influence on the body of the user caused by the first posture, based on the sensor data acquired from the sensor and the posture data.

10. An information processing apparatus comprising:
    a storage configured to store posture data about a plurality of postures of a person; and
    a controller configured to determine what type of an action is being performed by the user based on sensor data acquired from a sensor, select a set of posture data associated with the action that the user is performing from the posture data, and create advice for a user regarding a negative influence on a body of the user,
    wherein the sensor is configured to sense a first posture that the user is taking;
    the posture data is data that associates the plurality of postures with values indicating desirability of each posture, and is defined for each of a plurality of predefined actions; and
    the controller acquires a value of the desirability corresponding to the first posture and creates the advice, if the value indicating the desirability corresponding to the first posture is below a predetermined threshold.

11. The information processing apparatus according to claim 10, wherein
    the controller classifies the first posture based on a feature obtained from the sensor data.

12. The information processing apparatus according to claim 10, wherein
    the posture data comprises data associating the first posture and details of the negative influence on the body.

13. The information processing apparatus according to claim 12, wherein
    the posture data comprises data further associating the first posture and a level of stress that is placed on at least one of a plurality of body parts, and
    the controller creates the advice indicating the level of the stress.

14. The information processing apparatus according to claim 10, wherein
    the controller acquires a way to fix the posture to negate the negative influence on the body, based on the posture data.

15. The information processing apparatus according to claim 14, wherein
    the controller creates the advice including a manner of moving a body part such that the first posture is shifted to a second posture that negates the negative influence.

16. The information processing apparatus according to claim 10, wherein
    the controller determines the action that the user is performing, based on the sensor data that is acquired in time series.

17. The information processing apparatus according to claim 10, wherein
    the controller estimates the negative influence on the body of the user caused by the first posture, based on the sensor data acquired from the sensor and the posture data.

18. A non-transitory storage medium recording a program for causing a computer to perform:
    acquisition of posture data about a plurality of postures of a person;
    determination of an action type being performed by a user based on sensor data acquired from a sensor configured to sense a first posture that a user is taking;
    selection of a set of posture data associated with the action that the user is performing from the posture data; and
    creation of advice for the user regarding a negative influence on a body of the user, wherein the posture data is data that associates the plurality of postures with values indicating desirability of each posture, and is defined for each of a plurality of predefined actions; and a value of the desirability corresponding to the first posture is acquired and the advice is created, if the value indicating the desirability corresponding to the first posture is below a predetermined threshold.

* * * * *